US011302048B2

(12) United States Patent
Raviv et al.

(10) Patent No.: US 11,302,048 B2
(45) Date of Patent: Apr. 12, 2022

(54) COMPUTERIZED SYSTEM AND METHOD FOR AUTOMATICALLY GENERATING ORIGINAL MEMES FOR INSERTION INTO MODIFIED MESSAGES

(71) Applicant: YAHOO ASSETS LLC, Dulles, VA (US)

(72) Inventors: Ariel Raviv, Haifa (IL); Ran Wolff, Geva Carmel (IL)

(73) Assignee: YAHOO ASSETS LLC, Dulles, VA (US)

( * ) Notice: Subject to any disclaimer, the term of this patent is extended or adjusted under 35 U.S.C. 154(b) by 0 days.

(21) Appl. No.: 17/007,183

(22) Filed: Aug. 31, 2020

(65) Prior Publication Data

US 2022/0067991 A1    Mar. 3, 2022

(51) Int. Cl.
  *G06T 11/00*    (2006.01)
  *G06T 11/60*    (2006.01)
  *H04L 51/08*    (2022.01)
  *G06K 9/34*     (2006.01)
  *G06K 9/62*     (2022.01)

(52) U.S. Cl.
  CPC .............. *G06T 11/60* (2013.01); *G06K 9/344* (2013.01); *G06K 9/623* (2013.01); *G06K 9/6215* (2013.01); *H04L 51/08* (2013.01); *G06K 2209/01* (2013.01)

(58) Field of Classification Search
  CPC ...... G06T 11/60; G06K 9/344; G06K 9/6215; G06K 9/623; G06K 2209/01; H04L 51/08
  See application file for complete search history.

(56) References Cited

U.S. PATENT DOCUMENTS

| 10,185,468 | B2* | 1/2019 | Schneider, IV | ......... G06T 13/80 |
| 11,069,103 | B1* | 7/2021 | Blackstock | ........ G06K 9/00228 |
| 2008/0162528 | A1* | 7/2008 | Jariwala | ................ G06F 40/169 |
| 2009/0112830 | A1* | 4/2009 | Denoue | .................... G06F 16/58 |
| 2010/0082615 | A1* | 4/2010 | Clinchant | ............... G06F 16/58 707/728 |
| 2011/0191336 | A1* | 8/2011 | Wang | ...................... G06F 16/00 707/728 |

(Continued)

OTHER PUBLICATIONS

Shimomoto et al "News2meme: An Automatic Content Generator from News Based on Word Subspaces from Text and Image" 16th International Conference on Machine Vision Applications (MVA) National Olympics Memorial Youth Center, Tokyo, Japan, May 27-31, 2019. I (Year: 2019).*

*Primary Examiner* — Sean T Motsinger
(74) *Attorney, Agent, or Firm* — James J. DeCarlo; Greenberg Traurig, LLP

(57) ABSTRACT

Disclosed are systems and methods for improving interactions with and between computers in content providing, searching and/or hosting systems supported by or configured with devices, servers and/or platforms. The disclosed systems and methods provide a novel framework that automatically generates and recommends Internet memes for inclusion within electronically communicated messages. As a user is drafting a message, the input text of the drafted message is analyzed and a set of Internet (or visual) memes are compiled and presented to the user within the drafting interface. Upon selection of at least one of the memes, the message is modified by automatically removing the text from the message and replacing the now removed text with the selected meme.

19 Claims, 8 Drawing Sheets

(56) References Cited

U.S. PATENT DOCUMENTS

| | | | |
|---|---|---|---|
| 2017/0032553 A1* | 2/2017 | O'Donovan | G06K 9/6215 |
| 2017/0083172 A1* | 3/2017 | Schneider, IV | G06F 3/04847 |
| 2017/0235738 A1* | 8/2017 | Spaulding | G06F 3/0488 |
| | | | 715/203 |
| 2018/0054405 A1* | 2/2018 | Ritch | H04L 51/10 |
| 2018/0136803 A1* | 5/2018 | Parry | G06F 16/33 |
| 2019/0207901 A1* | 7/2019 | Chu | G06F 40/30 |
| 2021/0209289 A1* | 7/2021 | Kandur Raja | G06F 40/30 |

* cited by examiner

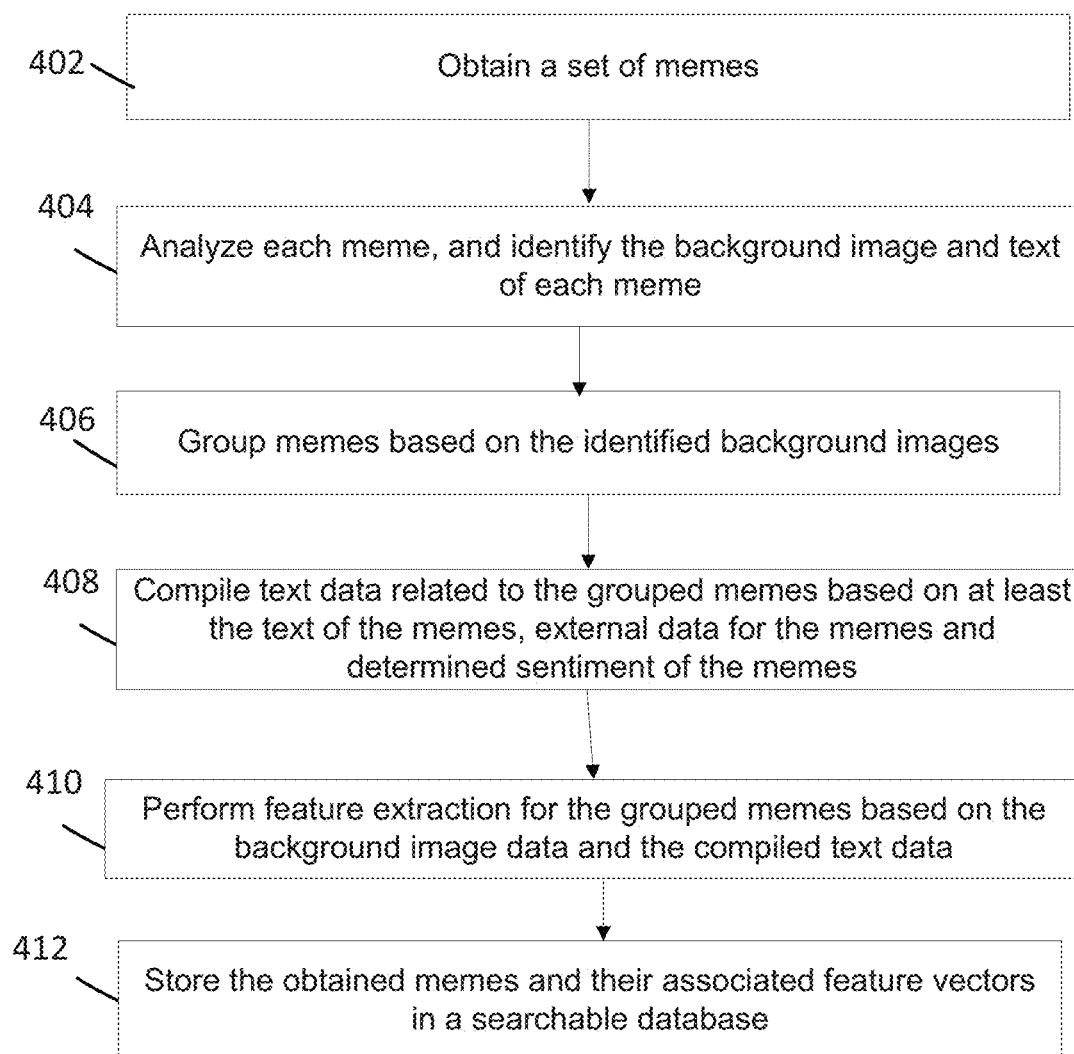

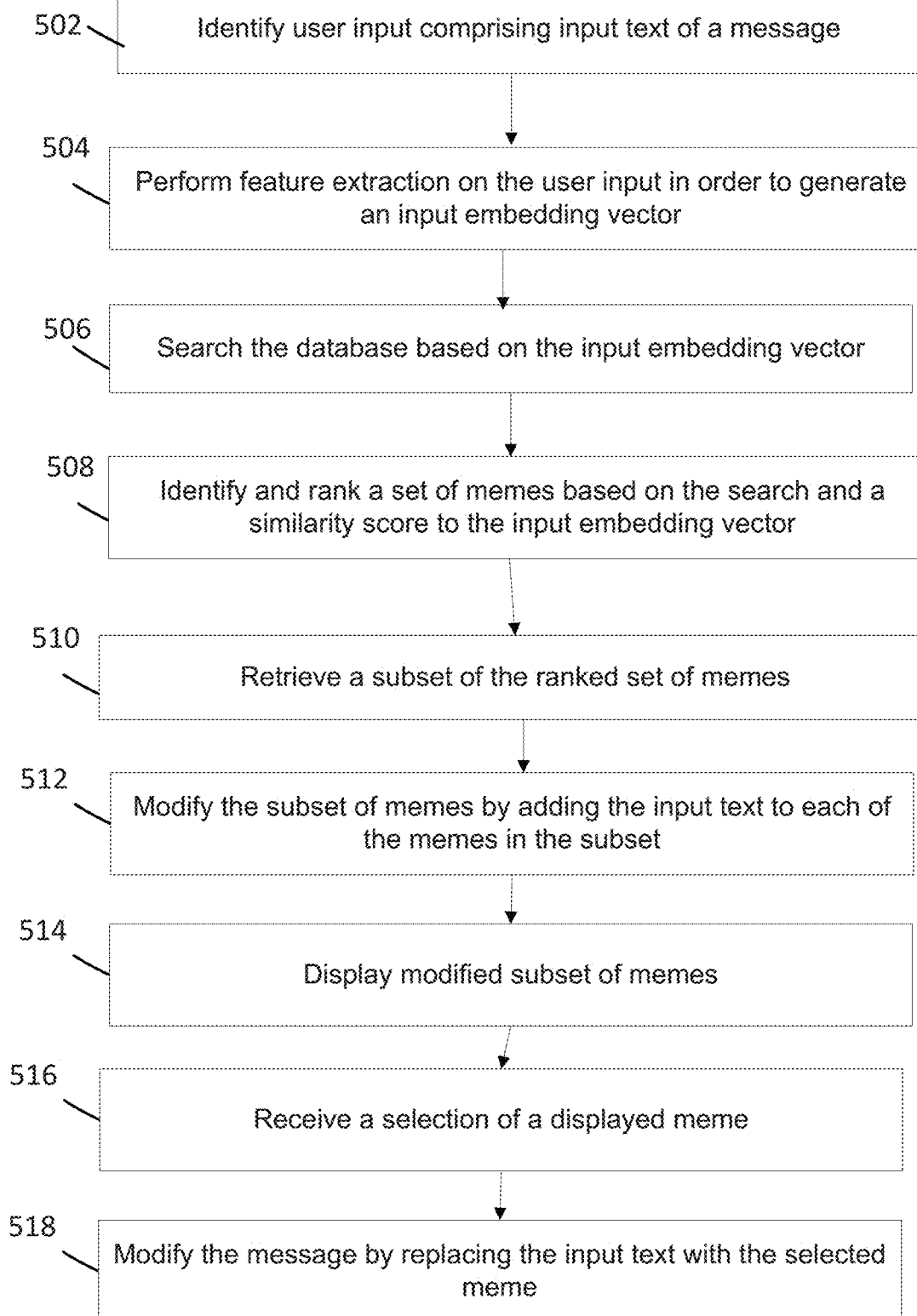

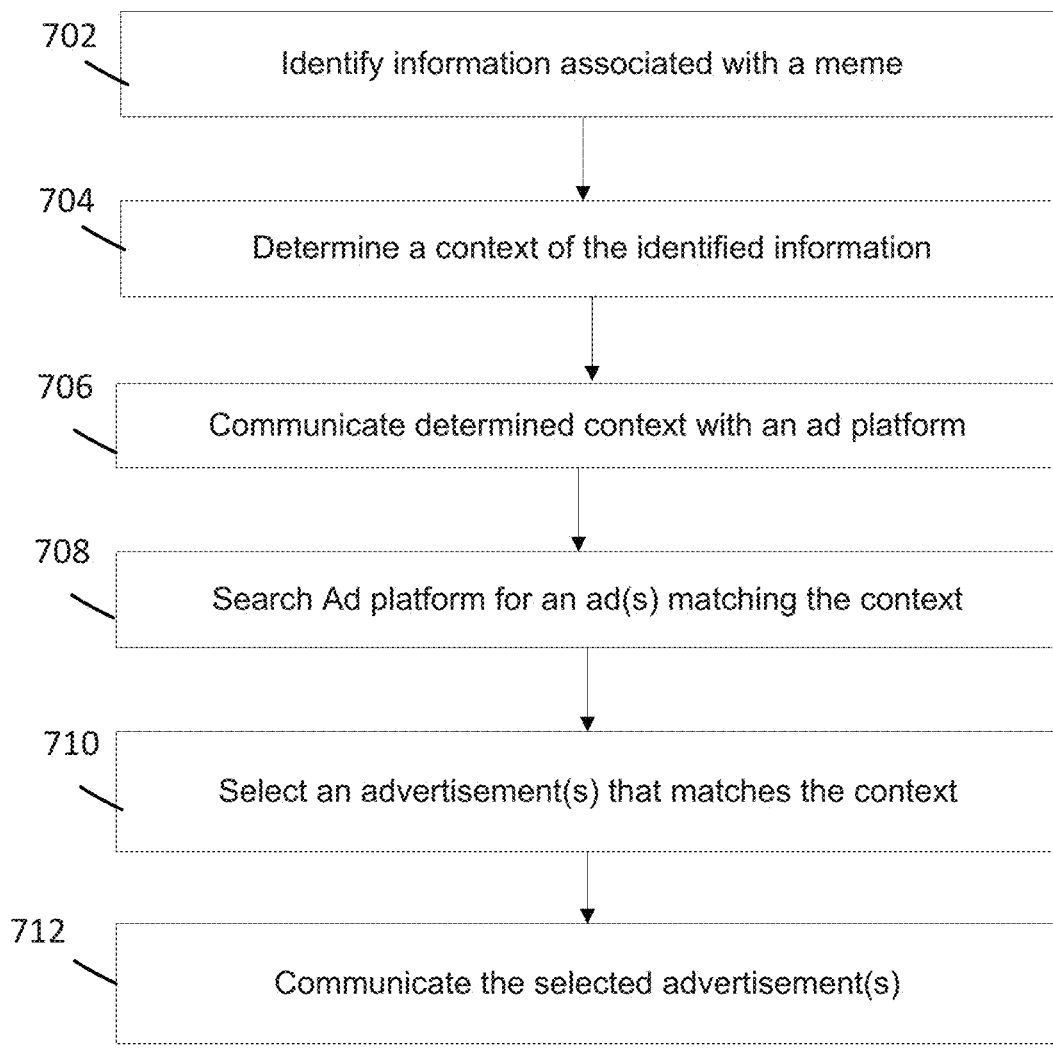

US 11,302,048 B2

COMPUTERIZED SYSTEM AND METHOD FOR AUTOMATICALLY GENERATING ORIGINAL MEMES FOR INSERTION INTO MODIFIED MESSAGES

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of network-based computerized content hosting and providing devices, systems and/or platforms by modifying the capabilities and providing non-native functionality to such devices, systems and/or platforms through a novel and improved framework for automatically generating and recommending Internet memes for inclusion within electronically communicated messages.

BACKGROUND

Internet (or modern or visual) memes, which are currently known as and commonly referred to as "memes", are defined as typically humorous images that are copied and modified, typically by adding text or iconography to it. Memes are designed to spread quickly over the internet, typically over social media or messaging platforms, to an exponential number of users. Typically, the more viral (or trending) the content or text included in the meme, the more popular and everlasting it will become on the Internet. Some memes rotate for years, while others live short, but often "explosive" lives.

Memes have essentially become "cultural artifacts" that memorialize events, societal sentiments, current social movements and/or humorous takes on commonly perceived occurrences. However, memes can be difficult to compose.

Current meme generation tools offer limited assistance, and typically provide an interface for keyword-based image retrieval and text manipulation. Users need to pick a representative search term, select the right image from a set of hundreds of common images, and then edit that image with manually entered text. After this, the user must then copy and paste the created meme into the relevant application (e.g., email, social networking platform, and the like).

SUMMARY

This disclosure provides a novel framework that alleviates the current shortcomings in meme generation. The disclosed systems and methods automatically compose and recommend memes to users. Rather than a user being encumbered by the manual tasks of sorting through thousands of images, then being required to manually enter text that is to be overlaid on an image, as in conventional systems, the disclosed framework automates these steps in meme generation. Thus, not only are memes being generated in a more efficient manner, they are reducing the amount of system resources required to produce a meme while increasing a meme's accuracy with regard to the message and content that is being portrayed.

Therefore, as discussed herein, the disclosed framework provides novel functionality where upon the detection of a snippet of text written by a user (e.g., a user drafting a message to another user, or a message to be posted to social media, for example), the framework can compile and recommend a set of relevant memes, complete with the background image and the input text. Thus, the complex computing and reliance on human-action for meme-generation, as in conventional systems, is off-loaded to the computerized framework for automatic meme generation and display.

By way of a non-limiting example, FIGS. 6A-6B illustrate example embodiments of the disclosed framework. While discussed in more detail below, FIG. 6A illustrates message 600, which is being composed by a user. The user enters text 602 which states "David, I'm sad to see you go."

According to embodiments of the instant disclosure, this text 602 is leveraged into the creation of a set of memes 604 that can be displayed as part of the message interface being used to draft the message 600. The drafting user can select one of these created memes, whereby, as illustrated in FIG. 6B, the message 600 is modified to message 650, where text 602 is replaced with the selected meme 652. Meme 652 includes a background image that corresponds to the text of 602; meme 652 also includes text 602, as discussed in more detail below.

Thus, as provided in the above example, illustrated in FIGS. 6A-6B and discussed in more detail below, the disclosed framework can be embodied as a stand-alone application, or can be integrated as part of existing or to be developed mail, social media and web application, thereby allowing users to easily transform each reply, comment or post into a rich, prominent and memorable message.

According to some embodiments, as discussed in more detail below, the disclosed framework can leverage known or to be known deep learning algorithms, techniques or mechanisms for text and image embeddings, which largely outperform keyword-based mechanisms (which are used in conventional meme-generating systems).

For purpose of this disclosure, the generation, compilation and recommendation of memes will be discussed according to the disclosed embodiments; however, it should not be construed as limiting, as any type of digital content (e.g., images, video, audio, text, and the like), media object and/or multi-media object (e.g., graphics interchange format (GIF) object) can be used herein without departing from the scope of the instant disclosure.

According to embodiments of the instant disclosure, the memes discussed herein will be in reference to the commonly shared and viewed meme on the internet: a snippet of text overlaid on a background image or incorporated into an image that contextually relates to the snippet. While the background image used herein is a "still" image, it should not be construed as limiting, as any type of content can be used as the background content of a meme without departing from the scope of the instant disclosure. For example, a meme's background image can be, but is not limited to, video content, GIF objects, text, multi-media, and the like, or some combination thereof.

In accordance with one or more embodiments, the instant disclosure provides computerized methods for a novel framework for automatically generating and recommending Internet memes for inclusion within electronically communicated messages. In accordance with one or more embodiments, the instant disclosure provides a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., application server, messaging server, email server, ad server, content server and/or client device, and the like)

cause at least one processor to perform a method for a novel and improved framework for automatically generating and recommending Internet memes for inclusion within electronically communicated messages.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 4 is a block diagram illustrating an exemplary data flow in accordance with some embodiments of the present disclosure;

FIG. 5 is a block diagram illustrating an exemplary data flow in accordance with some embodiments of the present disclosure;

FIG. 7 is a block diagram illustrating an exemplary data flow in accordance with some embodiments of the present disclosure.

DESCRIPTION OF EMBODIMENTS

Figure 1:
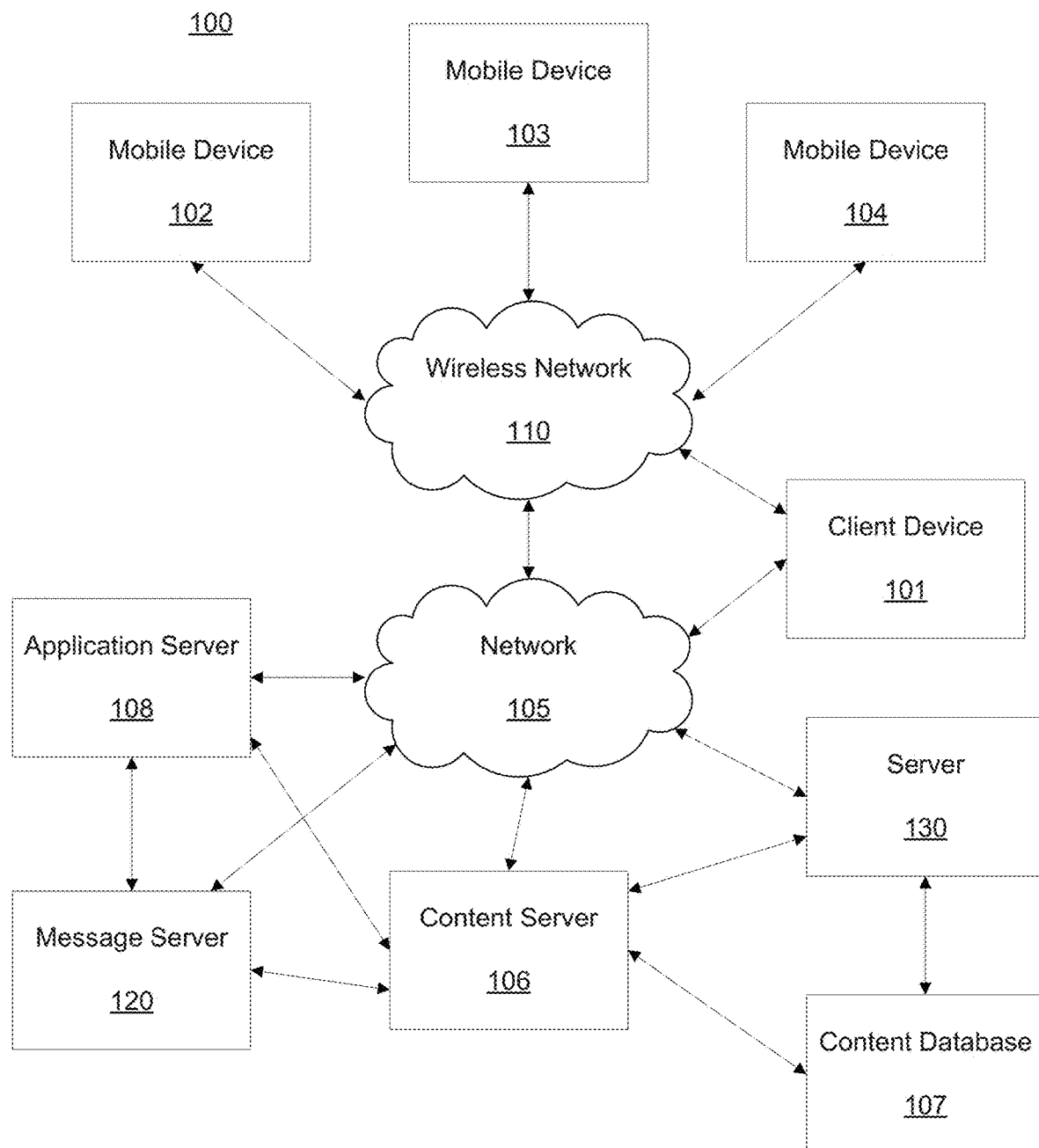
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

As discussed in more detail below at least in relation to FIG. 7, according to some embodiments, information associated with, derived from, or otherwise identified from, during or as a result of the meme generation and recommendation, as discussed herein, can be used for monetization purposes and targeted advertising when providing, delivering or enabling such devices access to content or services over a network. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, message server 120 and third party server 130.

One embodiment of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, searching for, viewing and/or sharing memes, photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

The content server 106 may include a device that includes a configuration to provide any type or form of content via a network to another device. Devices that may operate as content server 106 include personal computers, desktop computers, multiprocessor systems, microprocessor-based or programmable consumer electronics, network PCs, servers, and the like. Content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like. Such services, for example the email services and email platform, can be provided via the message server 120.

Third party server 130 can comprise a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user data. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is, advertisers will pay higher advertising rates when they believe their ads are being placed in or along with highly relevant content that is being presented to users. Reductions in the time needed to quantify a high quality ad placement offers ad platforms competitive advantages. Thus, higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en-masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, and the like) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, applications, such as a mail application (e.g., Yahoo! Mail®, Gmail®, and the like), instant messaging application, blog, photo or social networking application (e.g., Facebook®, Twitter®, Instagram®, and the like), search application (e.g., Yahoo! ® Search), and the like, can be hosted by the application server 108, message server 120, or content server 106 and the like.

Thus, the application server 108, for example, can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108 and/or 130 may be integrated into a single computing device, without departing from the scope of the present disclosure.

Figure 2:
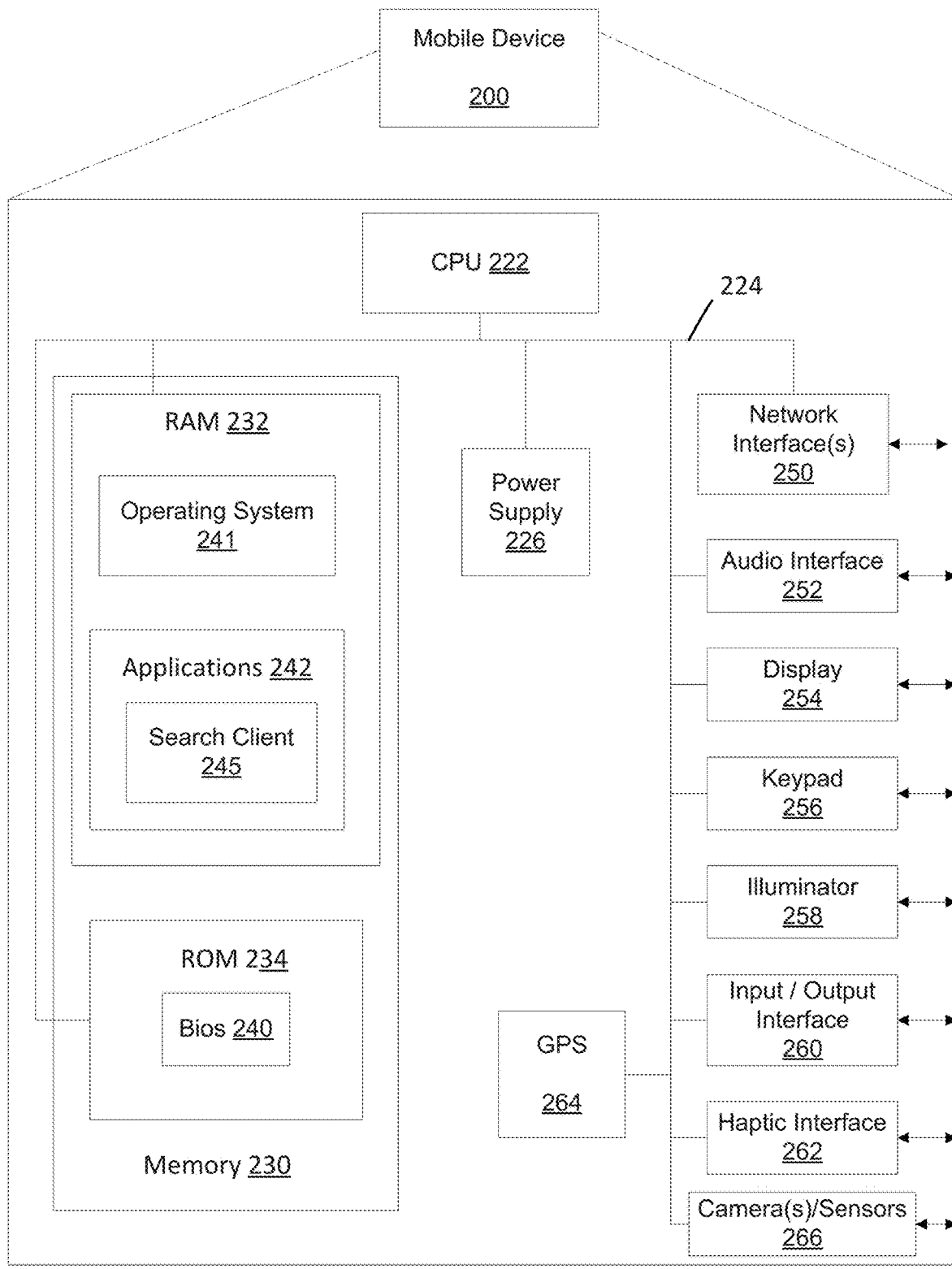
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 is arranged to produce and receive audio signals such as the sound of a human voice. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. Illuminator 258 may provide a status indication and/or provide light.

Client device 200 also comprises input/output interface 260 for communicating with external. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, tri-angulation, assisted GPS (AGPS), E-OTD, CI, SAI, ETA, BSS or the like, to further determine the physical location of Client device 200 on the surface of the Earth. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below.

Figure 3:
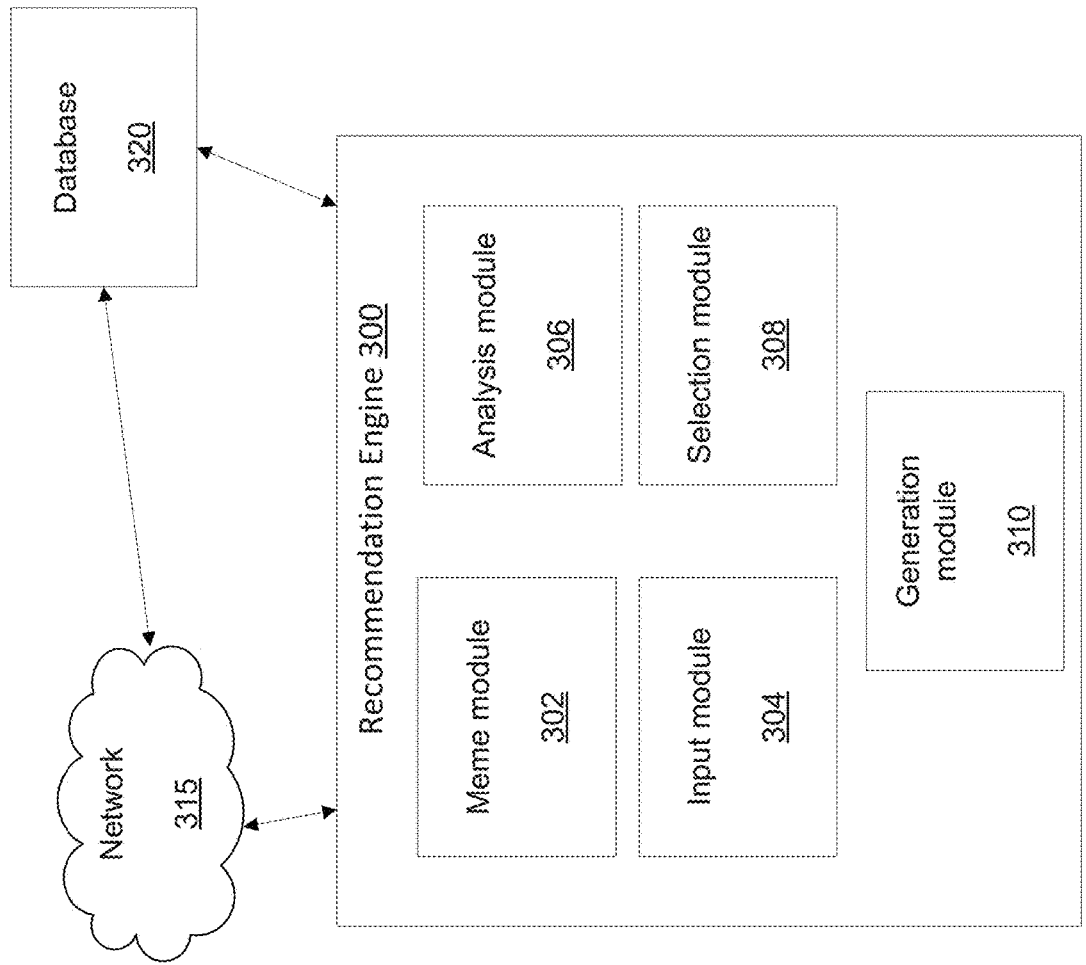
FIG. 3 is a block diagram illustrating components of an exemplary system in accordance with embodiments of the present disclosure.

FIG. 3 is a block diagram illustrating the components for performing the systems and methods discussed herein. FIG. 3 includes recommendation engine 300, network 315 and database 320. The recommendation engine 300 can be a special purpose machine or processor and could be hosted by a cloud server (e.g., cloud web services server(s)), messaging server, application server, content server, social networking server, web server, search server, content provider, third party server, user's computing device, and the like, or any combination thereof.

According to some embodiments, recommendation engine 300 can be embodied as a stand-alone application that executes on a user device. In some embodiments, the recommendation engine 300 can function as an application installed on the user's device, and in some embodiments, such application can be a web-based application accessed by the user device over a network. In some embodiments, the recommendation engine 300 can be installed as an augmenting script, program or application (e.g., a plug-in or extension) to another application (e.g., Yahoo! Mail®, Facebook®, and the like).

The database 320 can be any type of database or memory, and can be associated with a content server on a network (e.g., content server, a search server or application server) or a user's device (e.g., device 101-104 or device 200 from FIGS. 1-2). Database 320 comprises a dataset of data and metadata associated with local and/or network information related to users, services, applications, content and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with users, memes, images, videos, text, messages, products, items and services from an assortment of media and/or service providers and/or platforms, and the like.

For example, as discussed in more detail below in relation to FIGS. 4-6B, the stored data and metadata can be related to, but not limited to, a source of the meme, how often memes are shared, who created them, how they were shared (e.g., which platforms and in what form or type of message), the content of the meme (e.g., text and background image), external information retrieved from the internet related to the meme's content, and the like. Accordingly, any other type of known or to be known attribute or feature associated with a meme and/or its transmission over a network, a user and/or message, or some combination thereof, can be saved as part of the data/metadata in datastore 320.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the recommendation engine 300, and the database of stored resources 320. Indeed, as illustrated in FIG. 3, the recommendation engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as recommendation engine 300, and includes meme module 302, input module 304, analysis module 306, selection module 308 and generation module 310. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Turning to FIGS. 4-5, Processes 400 and 500, respectively, provide non-limiting data flows detailing how memes are generated and provided to users as recommended memes for use within messages, posts, articles, and other forms of electronic documents, and the like. Process 400 of FIG. 4 details embodiments of steps performed by engine 300 that can be executed offline for compiling and storing meme content. Process 500 of FIG. 5 details online steps of some embodiments for automatically generating and recommending memes to users based on detected text by leveraging the stored meme content from Process 400 of FIG. 4.

Turning to FIG. 4, according to some embodiments of Process 400, Steps 402-412 are performed by the meme module 302 of recommendation engine 300.

Process 400 begins with Step 402 where a set of memes is identified and retrieved, received, downloaded, mined or otherwise obtained over a network (e.g., the Internet). According to some embodiments, Step 402 can involve engine 300 crawling social media websites and online forums, and retrieving the memes that are posted therein.

In some embodiments this meme retrieval process can be performed periodically. In some embodiments, the retrieval process can involve retrieving the meme and the data surrounding the meme (e.g., which platform the meme was hosted on when it was retrieved, statistics indicating how many shares the meme incurred, which users were viewing and/or sharing the meme, in what context was the meme being viewed/shared, how was the meme being shared (e.g., in a tweet, for example), and the like). This data can be utilized as part of the text data compilation step discussed below in Step 408.

In Step 404, each of the obtained memes from Step 402 are analyzed in order to determine, extract, deduce, derive or otherwise identify the background image content and text of each meme. The analysis of each meme can be performed by any known or to be known image analysis technique, algorithm, classifier or mechanism, including, but not limited to, computer vision, Bayesian network analysis, Hidden Markov Models, artificial neural network analysis, logical model and/or tree analysis, and the like. Thus, in some embodiments, Step 404 involves analyzing each meme by parsing each meme, and identifying the background image content and the text that is in the foreground of the meme.

In Step 406, the memes are grouped (or clustered) based on the identified background images. According to some embodiments, the memes that have background image content corresponding to the same context, genre, category or other classification are grouped together.

In some embodiments, Step 406's grouping involves analyzing each meme's background image in a similar manner as discussed above in relation to Step 404, and determining the context, for example, of each background image. Then, the background images with a context matching to a threshold degree are grouped together.

In some embodiments, the grouping of the background images can be further based on the text of the meme that the background image was identified from. This textual analysis is discussed in relation to Step 408 below. In some embodiments, Steps 406 and 408 can be combined to an iterative step where the analysis of the background image and the text are performed in parallel or together. Thus, the contextual determinations of background images can be based, at least in part on, the text that accompanied the background image in the meme the background image was identified from.

Step 408 involves compiling the text data of the memes. The text data includes the data that was overlaid (or in the foreground) of the obtained memes from Step 402. The identification of this text data can be performed by engine performing any type of known or to be known textual analysis, natural language processing or the like, or computational analysis discussed above in relation to Step 404.

In some embodiments, Step 408 can involve retrieving content about the meme and/or the content included within the meme. For example, upon analyzing a meme, it is determined that the image depicted as the background image is a capture of a screen from a movie. Thus, here for example, Step 408 can involve retrieving content over the network from external sources (e.g., Wikipedia®, IMDB® and the like) that provides an explanation of the source material (e.g., the movie).

As discussed above, Steps 406-408 can be part of a single background image/text compilation grouping procedure. According to some embodiments, Steps 406 and 408 can be performed via common image clustering and OCR (Optical Character Recognition) techniques, for example, as discussed above. According to some embodiments, Steps 406-408 can be performed by using a deep learning framework that can be trained to "remove" (e.g., extract) the text from the image. Such frameworks can involve, but are not limited to, neural networks, computer vision, and the like, as discussed above.

In Step 410, feature extraction is performed for the grouped meme content. The disclosed feature extraction is based on the grouped background image content (from Step 406) and the compiled text data (from Step 408). The disclosed feature extraction involves mapping the background image data and text data into feature space such that a feature vector represents a given meme.

According to some embodiments, the feature space mapping of Step 410 can be explicit (e.g., keyword-based) or implicit (e.g., based on image and word embeddings). The feature space mapping to a feature vector(s) can be performed via any known or to be known technique, algorithm or mechanism, including but not limited to, deep learning frameworks (as discussed above) which encode images and texts into latent vectors.

In Step 412, the obtained memes (from Step 402) and the created vectors that respectively correspond to each of the memes (from Step 410) are stored in a searchable database (e.g., database 320, database 107, as discussed above). The storage of Step 412 is performed in manner such that a meme, its background image content and text, and its corresponding feature vector are stored in association with each other (e.g., in a look-up table (LUT).

According to embodiments of the instant disclosure, the storage of a meme performed in Step 412 involves storing, for a given meme, a meme data set: the background image (from Step 406), the compiled text data (from step 408) and the feature vector (from Step 410) as an associated entry in the database.

Turning to FIG. 5, according to some embodiments of Process 500, Step 502 is performed by the input module 304 of recommendation engine 300; Steps 504-510 are performed by the analysis module 306; Steps 512-516 are performed by the selection module 308; and Step 518 is performed by the generation module 310.

Process 500 begins with Step 502 where user input corresponding to input text is identified. Step 502 involves the entry of text within a message, a post or any other type of electronic document.

In some embodiments, Step 502 can involve automatically detecting that a certain amount of text has been entered that satisfies a snippet threshold. In some embodiments, such detection is performed by any type of known or to be known textual analysis technique, natural language processing or deep learning framework, and the like. For example, as a user enters text in a message, upon the user entering a snippet satisfying a number of characters, Step 502 can identify the text as input text (or as a word embedding). In some embodiments, Step 502 can detect the input text based upon punctuation.

Figure 6A:
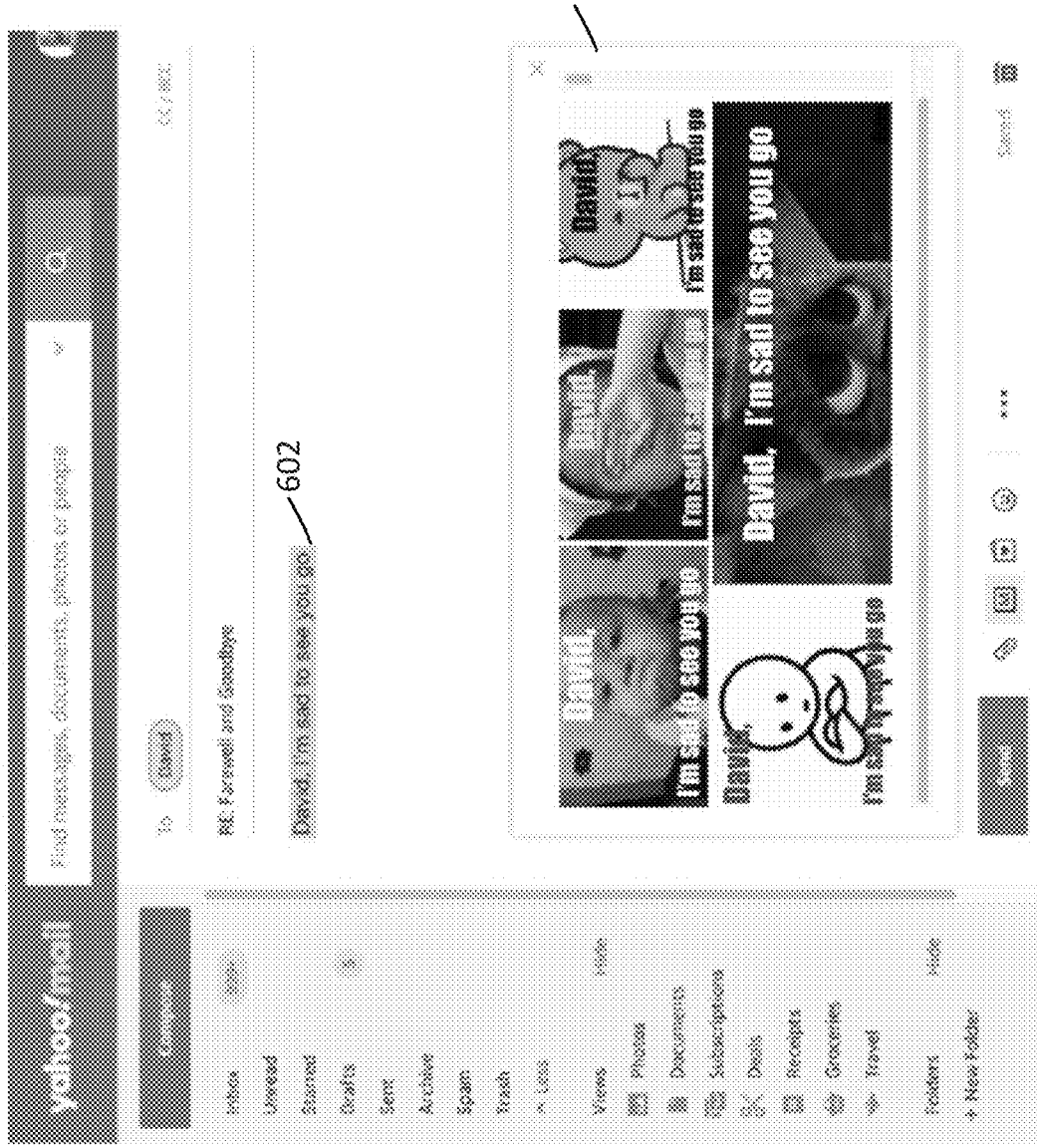
FIGS. 6A-6B illustrate non-limiting example embodiments of generating and recommending a meme(s) in accordance with some embodiments of the present disclosure.

In some embodiments, Step 502 can be triggered based upon selection or interaction with an interface object that enables the initiation of Process 500. In some embodiments, this interface object can be displayed as part of a message or text entry interface, and can be embodied as a button or interactive object. In some embodiments, the triggering of the identification of input text can be any type of input, such as, for example, voice activated, or highlighting of the text that is to be used as part of the created meme (as illustrated in FIG. 6A, item 602, and discussed below).

By way of a non-limiting example, for purposes of explaining the steps of Process 500, FIGS. 6A-6B will be discussed to provide a non-limiting example of the processing logic engine 300 is executing to generate and recommend a meme(s).

Thus, Step 502 involves the identification of input text. As illustrated in message 600 depicted in FIG. 6A, text 602 is highlighted and recites "David, I'm sad to see you go."

Turning back to Process 500, Step 504 involves performing feature extraction on the input text to generate an input embedding vector. The feature extraction performed in Step 504 on the input text of Step 502 is performed in a similar manner as the feature extraction discussed above in relation to Step 410.

In some embodiments, the Step 504 can also compile text data based on the input text, in a similar manner as discussed above in relation to Steps 402 and 408. For example, such additional data can be in relation to, but is not limited to, the platform the user is entering text, whether the text is a comment or a response (and if a response, what was the origin message's text and/or context), the context of the entered text, and the like.

In Step 506, the input embedding vector is utilized as a search query for searching the database of meme data (from Step 412: the stored meme data sets).

According to some embodiments, the search performed in Step 506 involves identifying the meme data from Step 412 that matches at least above a similarity threshold to the input embedding vector. Step 508. The searching can be performed any type of known or to be known feature vector matching technique, algorithm or mechanism, including, but not limited to, for example, pattern recognition, pattern regression, deep learning, machine learning, histograms, and the like For example, in relation to Steps 506-508, a similarity score is determined for each meme data set against the input embedding vector. Those meme data sets with similarity scores above a similarity threshold are identified and ranked based on their scores. In some embodiments, the meme data sets with similarity scores higher than others are ranked higher than the other meme data sets.

In some embodiments, the searching can be based on only a portion of the stored data in the meme data sets. For example, the search can be in accordance with the feature vector data for a meme, the background image data for a meme, the compiled text for the meme, and/or previous search queries which resulted in selection of a meme, or some combination thereof.

In Step 510, a subset of ranked memes from the identified and ranked set of memes (from Step 508) are retrieved. The subset of memes are those memes that satisfy a criteria. In some embodiments, the criteria can be an aesthetic value, another similarity score threshold (e.g., similarity in the latent feature space), a contextual value, a category, a historical value (e.g., how recent is the meme data), popularity value, and the like, or some combination thereof.

According to embodiments, the retrieved meme data in Step 510 is the background image for each meme in the subset.

In Step 512, the background images for the subset of memes identified in Step 510 are then modified by adding the input text (from Step 502). Step 512 involves creating a subset of memes by modifying each of background images by overlaying the input text (from Step 502). In some embodiments, such modification involves restructuring the image's data structure by moving the image to the background (or a background layer) and adding the text to the foreground (or a foreground layer). In some embodiments, such modification involves overlaying the text as a filter.

One of skill in the art would understand that any type of known or to be known image modification technique where text is overlaid or appears to be overlaid on or in an image can be implemented by engine 300 in Step 512.

The position and size of the text being used to modify the background image can be based on a number of factors, including, but not limited to, how text was overlaid on the background image in its source meme, how similarly grouped meme's text is overlaid, and the like, or some combination thereof. In some embodiments, the user can provide input or modify how the text is overlaid. Such user modification can occur at Step 512, or during Steps 514, 516 or 518, as discussed below.

In some embodiments, in addition to the position and size, the orientation, font type, color, rotation and/or effects of the text can be modified in a similar manner as discussed above.

In Step 514, the created memes from Step 512 are displayed. According to some embodiments, the messaging UI that was used to enter the text (Step 502) is modified to present the created memes. The modification can involve adding an interface object or module that displays the set of created memes therein, as interface objects themselves. The modification can include a pop-up window that overlays or causes the message UI to be resized so as to adjacently display the recommended memes next to the original message text/content. The modification can also involve embedding them as selectable content within the message UI.

For example, as illustrated in FIG. 6A, item 604 illustrates a non-limiting example of how the created meme subset is displayed. In some embodiments, the subset 604 can be displayed within an interface portion of message 600 (that can be embedded into the interface upon which the text 602 is being entered, as an interactive display), or as an overlay window portion. The subset 604 can be scrollable, as the number in the subset can be a dynamically determined number that is based on a criteria in which the subset is selected (e.g., the criteria used in Step 510).

In Step 516, a selection of a created meme in the subset is received. For example, a meme depicted in the subset 604 depicted in FIG. 6A is selected. In some embodiments, the selection can be performed automatically by selecting, for example, the top ranked meme. In some embodiments, the selection can be in response to a user selection.

In some embodiments, the selection causes the presented memes (from Step 514) to be removed, which as discussed above, can be the further modification of the message or message UI and/or the removal of the window upon which they were being displayed. Essentially, the modification of the message or message UI undoes the modifications of Step 514 in preparation of the modification occurring in Step 518 below.

In Step 518, the message is modified to replace the text with the selected meme. The modification causes the structure of the message to change from including text as part of the electronic document, to removing the text and integrating digital image content as part of the electronic document. This can alter the structure of the message to a different format. For example, the selected meme can be inserted or embedded into the message (e.g., in the body of the message, within the message structure previously occupied by the text). In some embodiments, the message can be modified to include the selected meme as an attachment. In some embodiments, the selected meme can be stored at a network location and the text can be replaced with a uniform resource locator (URL) that is associated with the network location.

Figure 6B:
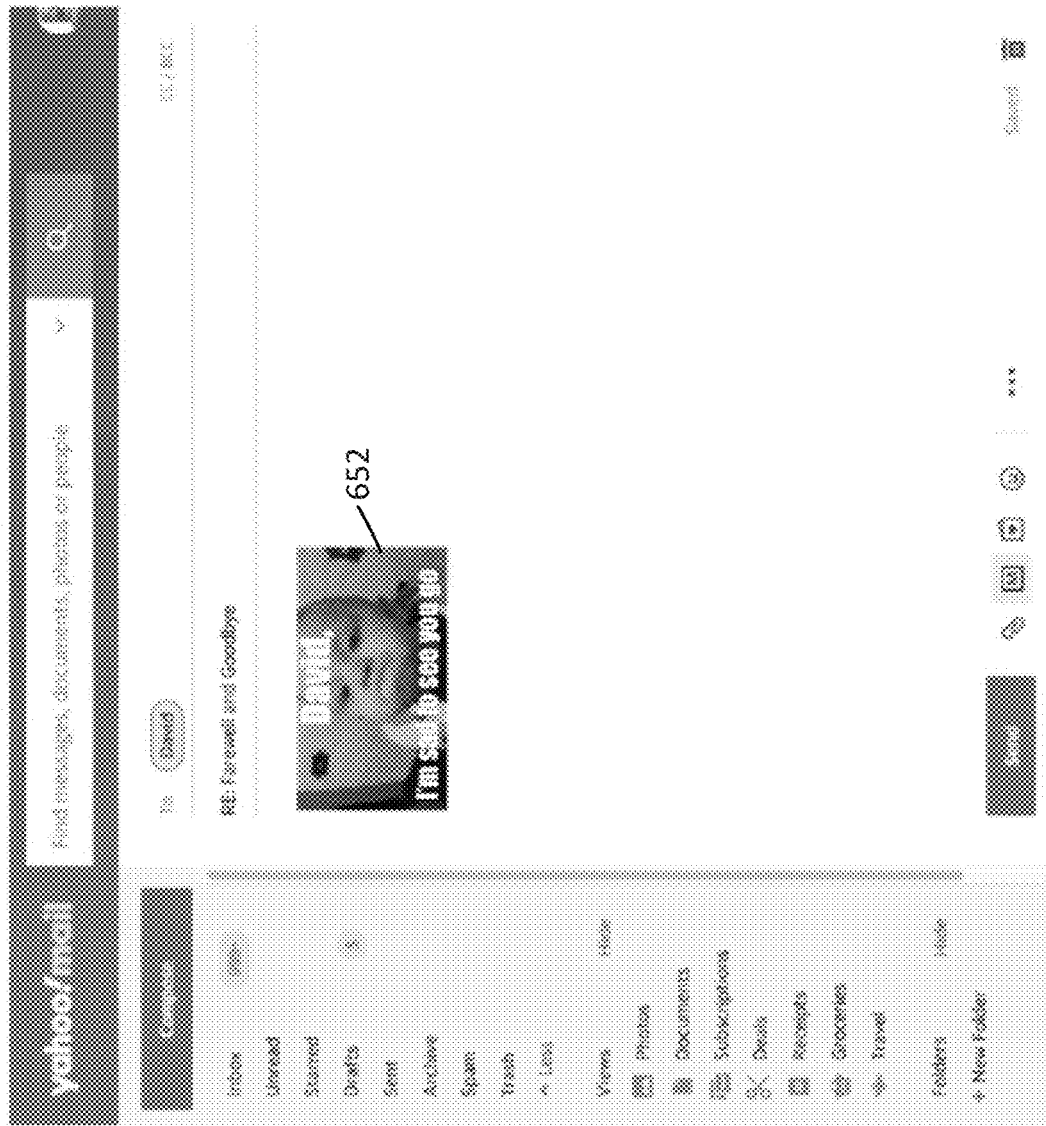

By way of a non-limiting example, message 600 depicted in FIG. 6A is modified to a version depicted as message 650 in FIG. 6B based on selection of one of the displayed memes in subset 604. The selection causes the subset 604 to be removed from the display of message 600 and results in selected meme 652 being displayed in place of the text 602, as illustrated in message 650 depicted in FIG. 6B. This modified message 650 is capable of being transmitted, posted, shared or otherwise downloaded or uploaded to a network in a typical manner as provided by the app, platform or service being used to draft message 600/650.

According to some embodiments, the modification of the message being performed in Step 518 can occur upon selection of the meme (e.g., during drafting of the message and prior to it being sent by the drafting user). In some embodiments, the message can be modified after it is sent, yet prior to delivery to the intended recipient(s) (e.g., another user(s) or platform). In such embodiments, the message is modified to include augmented information such that when the server receives the message, it can modify the message to replace the text with the meme, then send the message to the intended recipient(s).

FIG. 7 is a workflow process 700 for serving or providing related digital media content based on the information associated with a meme, as discussed above in relation to FIGS. 4-6B. In some embodiments, the provided content can be associated with or comprising advertisements (e.g., digital advertisement content). Such information can be referred to as "meme information" for reference purposes only.

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred to as an advertisement, it is still a digital media item that is renderable by a computing device, and such digital media item comprises digital content relaying promotional content provided by a network associated with a third party.

In Step 702, meme information is identified. This information can be derived, determined, based on or otherwise identified from the steps of Processes 400 and 500, as discussed above. For example, the meme information can be associated with the background image of a meme, the text inserted into the meme, the text of the message leveraged to create the meme, information related to the sender of the meme, information related to the recipient of the meme, the viral or tendering nature of the meme (e.g., which platforms what is shared on, how many shares, what responses and/or comments has it invoked, and the like), the external data related to the meme or entered text, queries users use when looking for a meme, as discussed above, and the like, or some combination thereof.

For purposes of this disclosure, Process 700 will refer to single generated meme; however, it should not be construed as limiting, as any number of memes or recommendations of memes, over any amount of time for any number of users, can form such basis, without departing from the scope of the instant disclosure.

In Step 704, a context is determined based on the identified meme information. This context forms a basis for serving content related to the meme information.

For example, as discussed above in relation to FIGS. 6A-6B, a meme is generated and inserted into a message, based on, at least in part, because David is leaving his current employer and Jane is writing a message to let him know she will miss him. The context of the meme can be derived from the entered text 602, and it can be determined to be "sad". Therefore, this can be leveraged in order to identify digital content related to products, services, deals or offers for the user at physical stores and/or online.

In some embodiments, the identification of the context from Step 704 can occur before, during and/or after the analysis detailed above with respect to Processes 400-500, or it can be a separate process altogether, or some combination thereof.

In Step 706, the determined context is communicated (or shared) with a content providing platform comprising a server and database (e.g., content server 106 and content database 107, and/or advertisement server 130 and ad database). Upon receipt of the context, the server performs (e.g., is caused to perform as per instructions received from the device executing the engine 300) a search for a relevant digital content within the associated database. The search for the content is based at least on the identified context.

In Step 708, the server searches the database for a digital content item(s) that matches the identified context. In Step 710, a content item is selected (or retrieved) based on the results of Step 708.

For example, using "sad" as the context, the content item can correspond to a "15% discount for the purchase of flowers" at the local flower shop.

In some embodiments, the selected content item can be modified to conform to attributes or capabilities of the message, or page, interface, platform, application or method upon which the meme will be sent and/or displayed, and/or to the application and/or device for which it will be displayed.

In some embodiments, the selected content item is shared or communicated via the application the user is utilizing to draft, view, render and/or interact with a message, text, media, content or object item. Step 712.

In some embodiments, the selected content item is sent directly to a user computing device for display on the device and/or within the UI displayed on the device's display (e.g., inbox, as a message within the inbox, or as part of the original message from which the selected content item was based).

In some embodiments, the selected content item is displayed within a portion of the interface or within an overlaying or pop-up interface associated with a rendering interface displayed on the device.

In some embodiments, the selected content item can be displayed as part of a coupon/ad clipping, coupon/ad recommendation and/or coupon/ad summarization interface.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternative embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising the steps of:
    identifying, at a computing device, text associated with a message, said text comprising a set of characters;
    searching, by the comping device, a database comprising a plurality of meme data sets based on said text, said search comprising identifying a ranked set of meme data sets that comprise information corresponding to the text, each meme data set corresponding to a meme and comprising text data included and related to the meme and external data retrieved over the network that corresponds to the meme;
    retrieving, by the computing device, from the database, background images associated with memes that correspond to the ranked set of meme data sets;
    creating, by the computing device, a set of memes based on the retrieved background images and the text, said creating comprising modifying each of the retrieved background images by adding the text to each background image;
    displaying, by the computing device, the set of memes;
    receiving, by the computing device, a selection of a meme from the displayed set of memes; and
    modifying, by the computing device, the message based on said selection, the modification of the message comprising removing the text from the message and adding the selected meme to the message.

2. The method of claim 1, further comprising:
    performing feature extraction on the text; and
    generating, based on said feature extraction, an input embedding vector, wherein said search is based on said input embedding vector.

3. The method of claim 1, wherein each meme data set comprises information related to a background image of the meme and a feature vector of the meme.

4. The method of claim 3, wherein said feature vector of the meme comprises background image data and text data configured in feature space.

5. The method of claim 4, further comprising:
    obtaining, over the network, a set of memes;
    analyzing each meme, and based on said analysis, identifying background content and text information included in each meme;
    analyzing, for each meme, the identified background content and text information;
    determining a context of each meme based on the analysis of the background content and text information; and
    forming groups of memes based on said determined context.

6. The method of claim 5, further comprising:
    performing feature extraction for the grouped memes; and
    storing, for each obtained meme, a meme data set in the database.

7. The method of claim 1, wherein said searching and identifying the ranked meme data sets is based on a determination of a similarity score to the text of the message.

8. The method of claim 1, further comprising:
    identifying a subset of the ranked set of meme data sets based on a criteria, wherein said retrieved background images correspond to memes related to the identified subset.

9. The method of claim 1, further comprising:
    requesting, over the network, third party digital content that corresponds to the selected meme;
    receiving, over the network, the third party digital content; and
    communicating, over the network, the third party digital content to a recipient of the modified message along with the modified message.

10. A non-transitory computer-readable storage medium tangibly encoded with computer-executable instructions, that when executed by a processor associated with a computing device, performs a method comprising the steps of:
    identifying, at the computing device, text associated with a message, said text comprising a set of characters;
    searching, by the comping device, a database comprising a plurality of meme data sets based on said text, said search comprising identifying a ranked set of meme data sets that comprise information corresponding to the text, each meme data set corresponding to a meme and comprising text data included and related to the meme and external data retrieved over the network that corresponds to the meme;
    retrieving, by the computing device, from the database, background images associated with memes that correspond to the ranked set of meme data sets;
    creating, by the computing device, a set of memes based on the retrieved background images and the text, said creating comprising modifying each of the retrieved background images by adding the text to each background image;
    displaying, by the computing device, the set of memes;
    receiving, by the computing device, a selection of a meme from the displayed set of memes; and
    modifying, by the computing device, the message based on said selection, the modification of the message comprising removing the text from the message and adding the selected meme to the message.

11. The non-transitory computer-readable storage medium of claim 10, further comprising:
    performing feature extraction on the text; and
    generating, based on said feature extraction, an input embedding vector, wherein said search is based on said input embedding vector.

12. The non-transitory computer-readable storage medium of claim 10, wherein each meme data set comprises information related to a background image of the meme and a feature vector of the meme.

13. The non-transitory computer-readable storage medium of claim 12, wherein said feature vector of the meme comprises background image data and text data configured in feature space.

14. The non-transitory computer-readable storage medium of claim 13, further comprising:
    obtaining, over the network, a set of memes;
    analyzing each meme, and based on said analysis, identifying background content and text information included in each meme;
    analyzing, for each meme, the identified background content and text information;
    determining a context of each meme based on the analysis of the background content and text information; and
    forming groups of memes based on said determined context.

15. The non-transitory computer-readable storage medium of claim 14, further comprising:
    performing feature extraction for the grouped memes; and
    storing, for each obtained meme, a meme data set in the database.

16. The non-transitory computer-readable storage medium of claim 10, wherein said searching and identifying the ranked meme data sets is based on a determination of a similarity score to the text of the message.

17. The non-transitory computer-readable storage medium of claim 10, further comprising:
identifying a subset of the ranked set of meme data sets based on a criteria, wherein said retrieved background images correspond to memes related to the identified subset.

18. A computing device comprising:
a processor; and
a non-transitory computer-readable storage medium for tangibly storing thereon program logic for execution by the processor, the program logic comprising:
logic executed by the processor for identifying, at the computing device, text associated with a message, said text comprising a set of characters;
logic executed by the processor for searching, by the comping device, a database comprising a plurality of meme data sets based on said text, said search comprising identifying a ranked set of meme data sets that comprise information corresponding to the text, each meme data set corresponding to a meme and comprising text data included and related to the meme and external data retrieved over the network that corresponds to the meme;
logic executed by the processor for retrieving, by the computing device, from the database, background images associated with memes that correspond to the ranked set of meme data sets;
logic executed by the processor for creating, by the computing device, a set of memes based on the retrieved background images and the text, said creating comprising modifying each of the retrieved background images by adding the text to each background image;
logic executed by the processor for displaying, by the computing device, the set of memes;
logic executed by the processor for receiving, by the computing device, a selection of a meme from the displayed set of memes; and
logic executed by the processor for modifying, by the computing device, the message based on said selection, the modification of the message comprising removing the text from the message and adding the selected meme to the message.

19. The computing device of claim 18, wherein each meme data set comprises information related to a background image of the meme and a feature vector of the meme, wherein said feature vector of the meme comprises background image data and text data configured in feature space.

* * * * *